United States Patent [19]

McEwen et al.

[11] Patent Number: 5,192,864
[45] Date of Patent: Mar. 9, 1993

[54] TWO DIMENSIONAL DISPLAY PRODUCED BY ONE DIMENSIONAL SCANNED EMITTERS

[75] Inventors: Robert K. McEwen; Alan D. MacLeod, both of Essex, United Kingdom

[73] Assignee: GEC-Marconi Limited, Stanmore, United Kingdom

[21] Appl. No.: 748,212

[22] Filed: Aug. 21, 1991

[30] Foreign Application Priority Data

Sep. 5, 1990 [GB] United Kingdom ............... 9019335

[51] Int. Cl.$^5$ .............................................. H01J 3/14
[52] U.S. Cl. .................................... 250/234; 340/755
[58] Field of Search ................... 250/234, 235, 236; 340/755; 358/113, 208

[56] References Cited

U.S. PATENT DOCUMENTS 4,340,888 7/1982 Seroskie .............................. 340/755
4,670,654 6/1987 Ross .................................... 358/113
4,692,808 9/1987 Chism, Jr. .
4,934,773 6/1990 Becker ................................ 340/755

FOREIGN PATENT DOCUMENTS 0301801A  2/1989  European Pat. Off. .
2002196A  6/1978  United Kingdom .
2057811A  7/1980  United Kingdom .
2057812A  7/1980  United Kingdom .
2087189A 11/1980  United Kingdom .
2087190A 11/1980  United Kingdom .
2119196A 12/1982  United Kingdom .

Primary Examiner—David C. Nelms
Attorney, Agent, or Firm—Lowe, Price, LeBlanc & Becker

[57] ABSTRACT

An display arrangement 16 comprises a two dimensional imaging array 3. Each column of the image array 3 is read sequentially by an electronic circuit 11. This energizes a one dimensional LED array 12 in dependence upon the received radiation. A motor 9 rotates a mirrored surface of a polygon 18 such that the image of the LED array is scanned. An observer viewing the LED array 12 via eyepiece 13 appears, due to persistence of visions, to see a complete image.

7 Claims, 3 Drawing Sheets

TWO DIMENSIONAL DISPLAY PRODUCED BY ONE DIMENSIONAL SCANNED EMITTERS

BACKGROUND OF THE INVENTION

This invention relates to a display arrangement using Focal Plane Arrays (FPAs), and in particular but not exclusively to an imager for use in the Infra Red (IR) wavebands using pyroelectric FPAs.

IR imaging systems are becoming more important in many fields now, in particular military, security and search and rescue applications. Early IR imagers employed a small number of detector elements, across which was scanned an IR image of the scene via a system of mirrors and polygons. More recent developments include imagers based on 2 dimensional arrays of detector elements so called staring arrays, which require no scanning to produce a useful image of the scene. The dwell time available for each detector element in such systems is considerably increased over earlier scanner systems resulting in significantly improved system performance being achievable from comparable detector materials. The IR system designer can choose whether to exploit this increase in performance or use a lower performance detector material to achieve a similar sensitivity as in the earlier scanner systems. High system performance is typified by imagers based on arrays of Cadmium Mercury Telluride cooled to liquid nitrogen temperatures, whilst conventional levels of performance are achieved by imagers based on pyroelectric and other bolometric detector arrays. These latter systems offer significant advantages in terms of cost and/or logistical support requirements (such as coolant supplies) over the high performance systems.

Applications of the more modest performance systems include personal battery powered imagers and rifle sights, and in general such systems utilise a cathode ray tube (CRT) for the display of information to the user. Such displays, although commonly used, suffer from considerable disadvantages. In particular, the CRTs are manufactured using vacuum glass technology, and as such are particularly fragile unless steps are taken to ruggedise the tube. Also likely to suffer damage from vibration and shock are the delicate electrodes and phosphor screen coatings. Although ruggedised CRTs are available they are expensive and more bulky than their conventional equivalents. In addition, the power consumption of CRTs is usually in excess of one watt, and can run to several watts for the larger and/or ruggedised tubes, not including the requirements of the drive electronics. A further problem associated with CRT displays is that the electronic drive circuits rarely operate with the same scan sequences as the detector, resulting in the requirement for frame storage and data resequencing—if only at different timings—between the detection and display processes.

Some early thermal imaging systems based on scanning mirrors, which sweep the image past a relatively small number of detectors, utilise the back of the mirror to sweep an image of a small array of LEDs across the field of view of the eye. Persistence of vision causes the image to appear continuous. For systems based on staring focal plane arrays, however, such mirror arrangements are not possible, since the array simply stares into space without the requirement for scanning mirrors etc. to detect an image.

SUMMARY OF THE INVENTION

According to the present invention there is provided a display arrangement comprising: means for receiving data representatives of a two dimensional image; a linear array of optical elements arranged to sequentially receive signals representative of the intensity of a sub region of the image and to produce an optical output in dependence thereon; and a reflective surface arranged to scan the array of optical elements to produce a two dimensional image which is representative of the received image.

By employing the invention a two dimensional image may be displayed to an operator by means of a reflective surface scanning a one dimensional array of optical generating elements using the natural persistence of the operator's eye to generate a two dimensional image, thereby eliminating the need for frame storage means, associated complex processing circuitry, and cathode ray tube.

Pyroelectric and other bolometric detectors, including all ferroelectric devices, detect the modulation of radiation incident on the detector rather than absolute radiation. Initial examples of such imaging devices were based on the pyrovidicon tube. However more recently solid state pyroelectric devices have become available with substantially increased performance over the vidicon tube technology. For both of these imaging detectors the signal is read from the focal plane in a raster fashion, by a scanning electron beam in the case of the vidicon and by multiplexing the output of the elements onto a single or multiple readout line for the solid state devices. The IR radiation incident on the detector is modulated by means of a mechanical chopper which is synchronised with the readout, such that the chopper edge crosses each section of the focal plane immediately after its output has been interrogated.

Advantageously where it is desired to employ means for interupting the received radiation that means is mechanically coupled to the reflective surface, thereby utilising a single synchronised drive means to move the 'interrupting means, or chopper' and the reflective surface.

BRIEF DESCRIPTION OF THE DRAWINGS

Two embodiments of the invention will now be described by way of example only with reference to the accompanying drawings, of which:

FIG. 2b is a plan view of the cylinder of FIG. 2a;

DETAILED DESCRIPTION OF THE DRAWINGS

Figure 1:
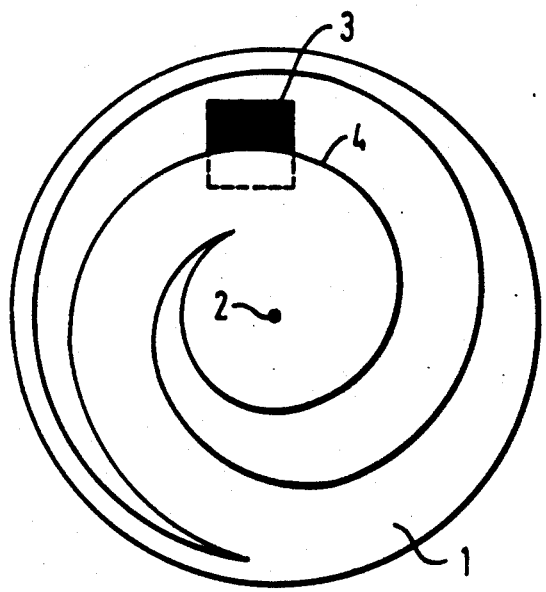
FIG. 1 is a plan view of a chopper and sensor array for use with a first embodiment of the invention.

Referring to FIG. 1 there is illustrated a chopper 1 which rotates about axis 2 and is positioned in the receiving path of a focal plane imaging array 3 comprising a two-dimensional array of sensing elements. On rotation clockwise of the chopper 1 about the axis 2 the leading edge 4 progresses across the sensor array 3, the rotation being synchronised with readout from the elements, such that the chopper edge 4 crosses each element of the array immediately after its output has been interrogated. This ensures maximum sensitivity, the chopper edge 4 sweeping across the array with a constant linear velocity.

Figure 2A:
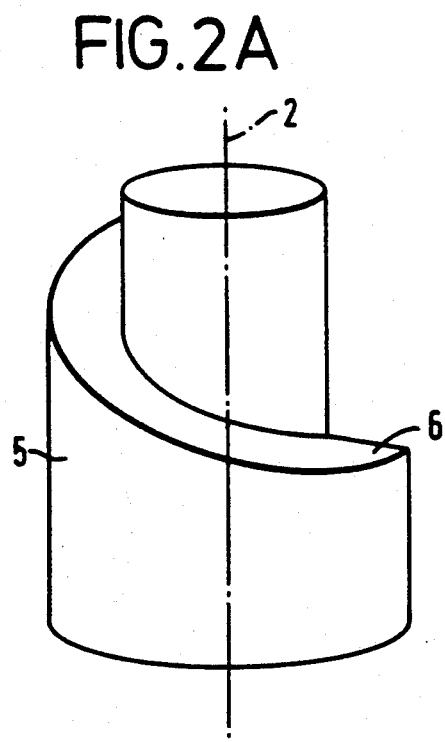
FIG. 2a is a schematic view of a cylinder supporting a mirrored surface for use in the first embodiment of the invention.
Figure 2B:
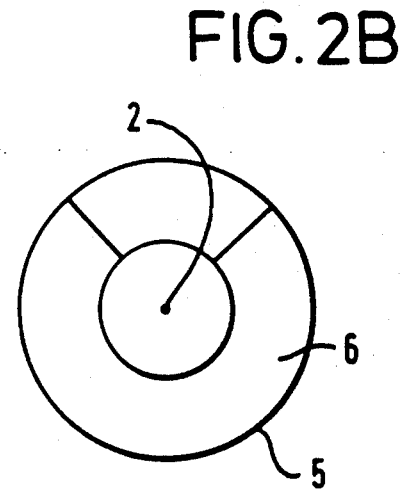

Referring to FIGS. 2a and 2b there is illustrated a cylinder 5 carrying a substantially helical mirrored surface 6 for rotation about an axes 2. This cylinder arrangement is used in conjunction with the chopper depicted in FIG. 1 in the imager 7 of FIG. 3.

Figure 3:
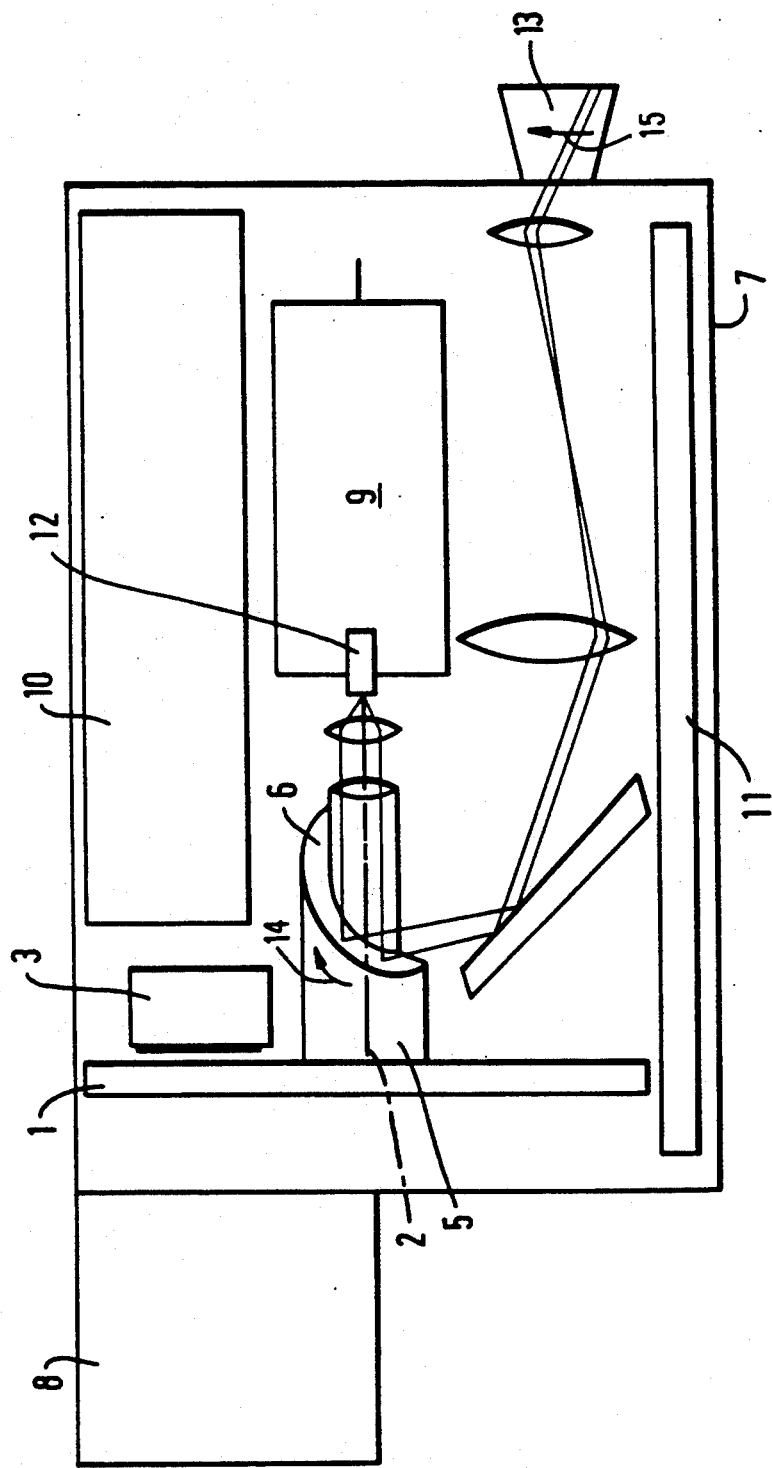
FIG. 3 is a diagrammatic representation of an imager in accordance with a first embodiment of the invention.

The imager 7 of FIG. 3 comprises a lens 8 for focusing radiation on to imaging array 3. The chopper 1 of FIG. 1 is located between the lens 8 and the array 3 and is rotated about axis 2 by motor 9, which also drives the cylinder arrangement 5, 6.

In operation the motor 9 and electronic circuitry 1 are driven by battery 10 such that the chopper 1 and cylinder 5 are rotated, the rotation being synchronised to the readout of the imaging array 3 by the electronic circuit 11. The array 3 is read line by line immediately prior to the chopper leading edge 4 of FIG. 1 obscuring that line of sensor elements. Circuit 11 amplifies the signals from each consecutive line and transmits these to a linear light emitting diode array 12 such that each line image o the sensor array 3 is sequentially displayed on the LED array 12.

The mirrored surface 6 carried by the cylinder 7 rotating about the axis 2 reflects light to an eye piece 13. However as the cylinder 5 rotates the reflective surface 6, reflecting the radiation from the LED array 12, effectively moves in the direction of the arrow 14 causing the apparent image of the LED array at the eye piece to move in the direction of arrow 15. Thereby each line of the image sensor 3 displayed by the LEDs 12 appears at the eye piece 13 to be scanned in the direction of the arrow 15. Due to persistence of vision the observer sees a complete image as detected by the imaging array 3.

Figure 4:
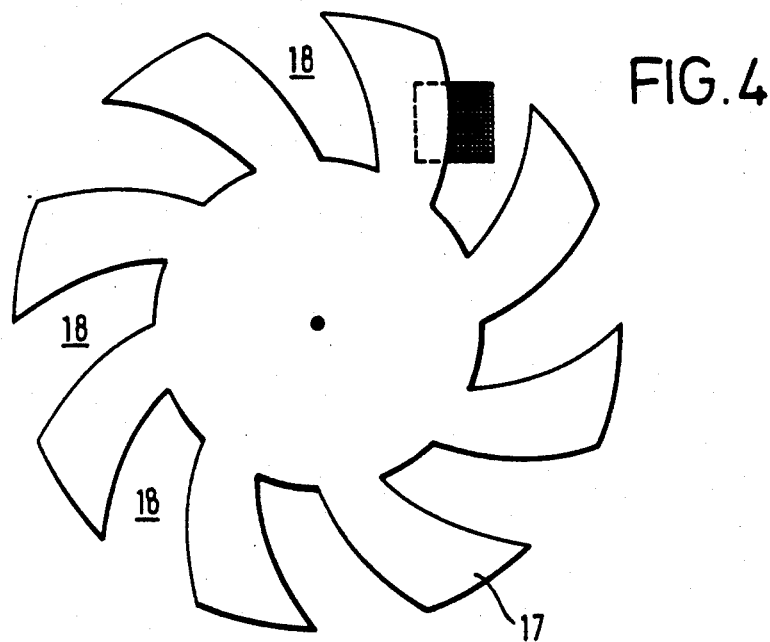
FIG. 4 is a plan view of a chopper and sensor array for use with a second embodiment of the invention.
Figure 5:
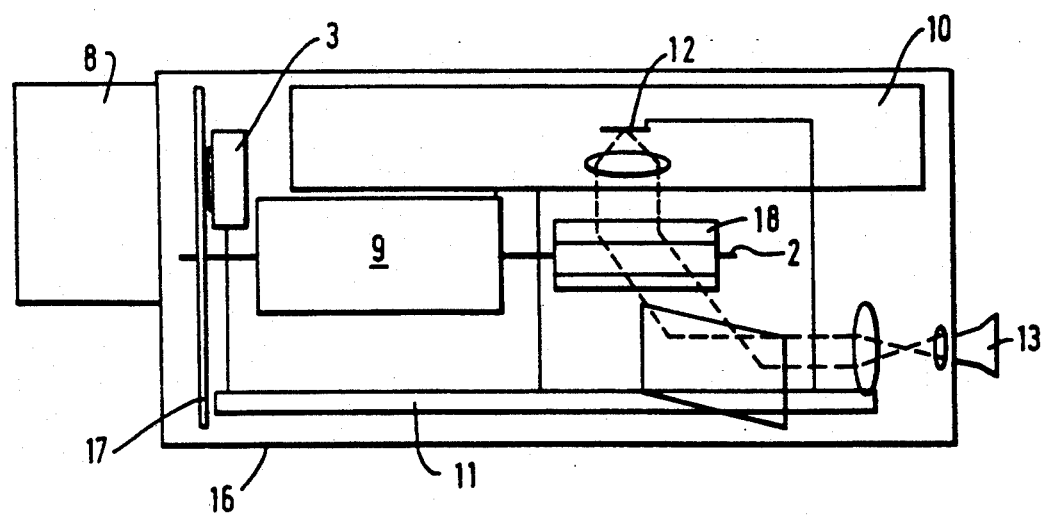
FIG. 5 is a diagrammatic illustration of a thermal imager in accordance with the second embodiment of the invention.

FIGS. 4 and 5 illustrate schematically a second embodiment which eliminates the need for the complex cylinder/mirrored surface arrangement 5 and 6. The imager 16 of FIG. 5 comprises the chopper 17 depicted in FIG. 4 which has a plurality of apertures 18. The motor 9, imaging array 3 and electronic circuitry 11 are arranged such that for each revolution of the chopper 17 eight frames are imaged by the imaging array 3. The operation of the second embodiment is essentially the same as the first except that the imaging array 3 is now scanned in a lateral direction with the LED array 12 being arranged parallel to the axis 2. The cylinder mirrored surface arrangement 5 and 6 of FIG. 3 has been replaced by an eight sided polygon such that for each ⅛ of a rotation by the chopper 17 an image of the LED array is scanned across the eye piece 13. Each column of the sensor array 3 is read out by the electronic circuit 11 and amplified and transferred to the LED array 12. Successive columns as displayed by the LED array 12 are scanned across the eye piece such that due to persistence of vision an observer appears to see a complete image as seen by the imaging array 3.

What we claim is:

1. An imager comprising: a sensor array consisting of a two dimensional array of sensing elements positioned relative to the lens such that the lens focuses on image on the sensor array; a rotatable chopper providing a shuttering function for the array; readout means for the sensor array; mechanical drive means for the chopper synchronized to the readout means; a linear array of optical elements, arranged to sequentially receive signals representative of the intensity of a sub-region of the image and to produce a sub-image in dependence thereon; and a reflective surface mechanically coupled to said chopper and arranged to scan the sub-images sequentially formed by the optical elements to produce, to an observer due to the persistence of vision, a two dimensional image which is representative of the received image.

2. An imager as claimed in claim 1 wherein the chopper has a plurality of apertures and the reflective surface comprises one surface of polygon, the polygon having a number of reflective surfaces equal to the number of apertures in the chopper.

3. An imager as claimed in claim 1 wherein image information is transferred directly form the sensor array to the array of optical elements.

4. An imager as claimed in claim 1 wherein the chopper comprises a spiral shaped shutter and the reflective surface is substantially helical.

5. An imager as claimed in claim 1 wherein the optical elements are light emitting diodes.

6. An imager as claimed in claim 1 wherein the sensing element are pyroelectric.

7. An imager as claimed in claim 1 wherein the sensor array is sensitive to thermal radiation.

* * * * *